INVENTORS
MARVIN J. ALBINAK
BY WARREN H. TURNER
W. A. Schaich
Richard D. Heberling
ATTORNEYS

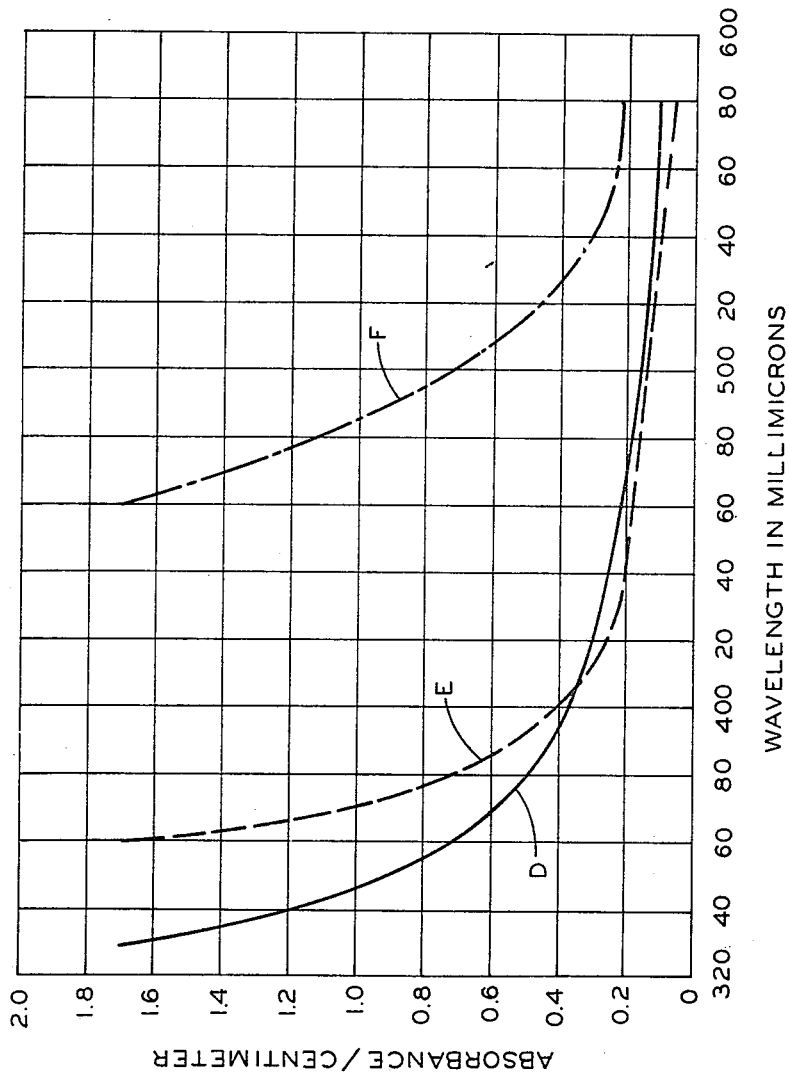

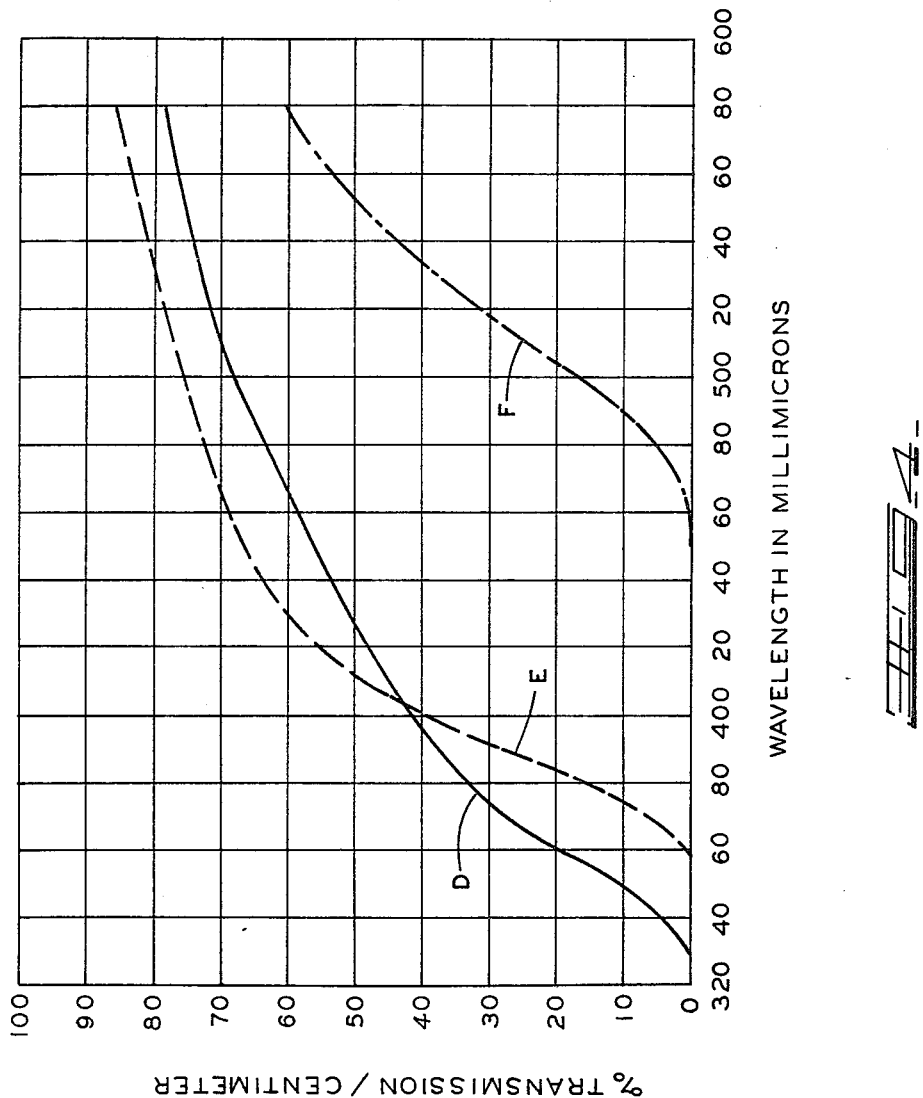

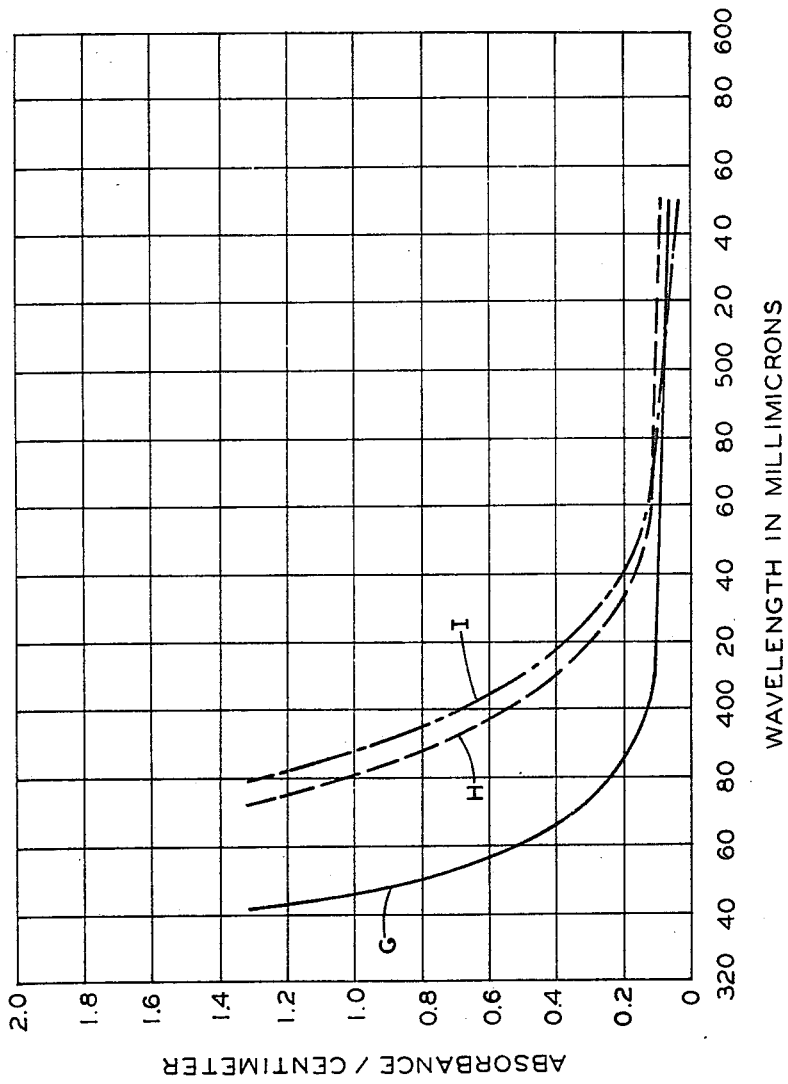

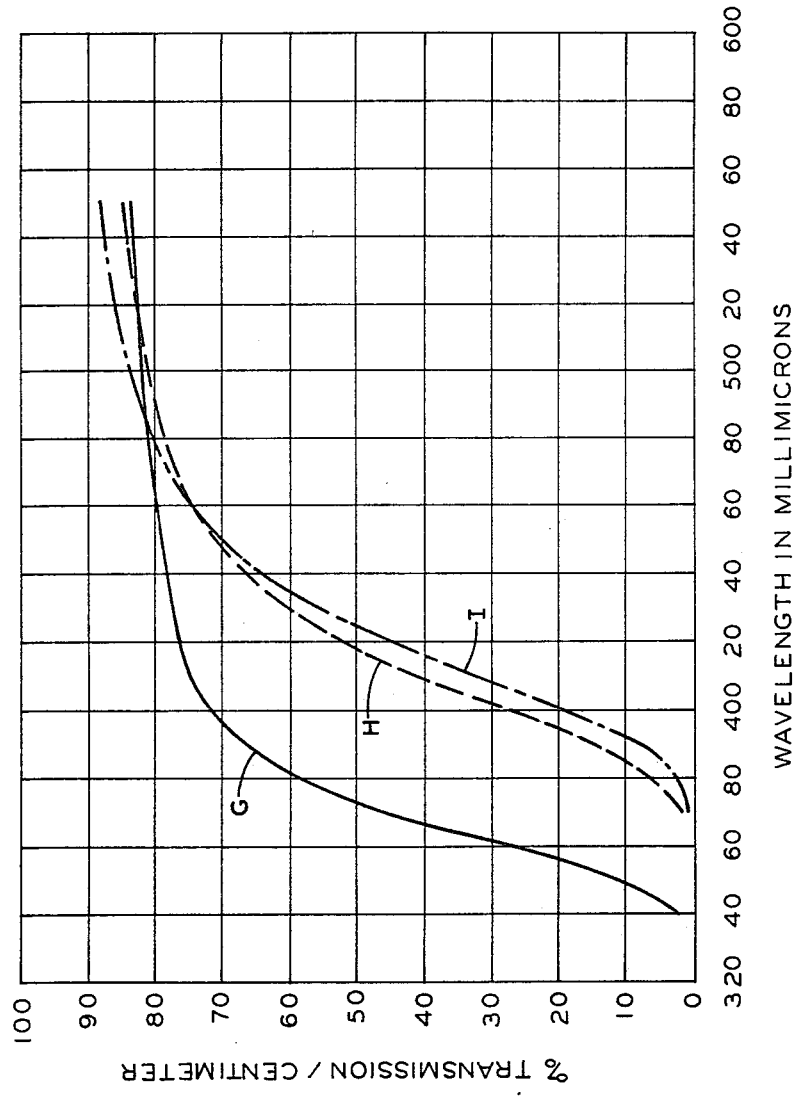

United States Patent Office 3,499,775
Patented Mar. 10, 1970

3,499,775
ULTRAVIOLET-ABSORBING GLASS COMPOSITIONS CONTAINING CERIUM AND MOLYBDENUM OXIDES
Marvin J. Albinak, Wheeling, W. Va., and Warren H. Turner, Toledo, Ohio, assignors to Owens-Illinois, Inc., a corporation of Ohio
Filed July 1, 1966, Ser. No. 562,330
Int. Cl. C03c 3/24
U.S. Cl. 106—47         14 Claims

ABSTRACT OF THE DISCLOSURE

An ultraviolet ray-absorbing glass, such as a soda-lime-silica glass containing from about 0.1 to 5% by weight $CeO_2$ and from about 0.1 to 5% by weight $MoO_3$. These two ingredients together impart the improved ultraviolet ray-absorbing properties to the glass.

Figure 2:
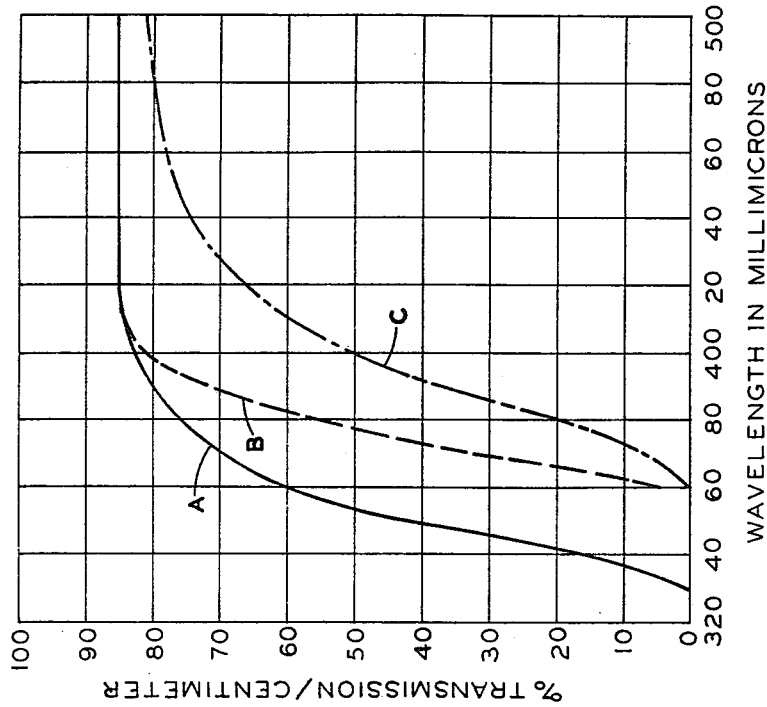

This invention relates to glasses which absorb ultraviolet radiation and short wave radiation within the visible spectrum, and more particularly, to compositions of such glasses.

The invention is of particular utility in the manufacture of glass bottles, jars and other containers used for the packaging of food, beverage, and pharmaceutical products which are detrimentally affected by undesirable photochemical effects produced by such radiation.

In the case of comestible products marketed in glass bottles or other containers, the deterioration in taste of the contents, such as beer, wine, ale, orange-flavored soft drinks, and the like, the development of rancidity in cooking oils, and the loss of vitamin C content of milk, are examples of undesirable photochemical reactions. These reactions are caused by exposing the foodstuffs to ultraviolet radiation and also to some extent to short wave radiation within the visible spectrum. The ultraviolet region of the electromagnetic spectrum is that region near the visible spectrum including wavelengths from 20 to 380 millimicrons which are longer than X-rays and shorter than visible light rays. Generally, the ultraviolet portion of the spectrum is termed anything below 400 millimicrons, while the visible range comprises from about 400 to 700 millimicrons.

In many applications where ultraviolet protection is desired, a high degree of visible transmission is also desired. This is true in the cases of the ultraviolet absorbent glass containers and ultraviolet absorbent ophthalmologic lenses. In these applications, a sharp decrease in the absorption characteristics is desirable at about 400 millimicrons.

Heretofore many materials have been used in glass compositions to achieve this effect. One of these materials has been cerium. While cerium has many desirable absorptive characteristics of itself, it is often necessary to incorporate substantial amounts of cerium oxide into the glass in order to achieve the desired results. For instance, if an effective ultraviolet absorbent glass is required, it is often necessary to incorporate as much as 3–6 or more percent of $CeO_2$ in the composition. When cerium is used as a colorant it is often necessary to use 6 percent or more in order to achieve the desired yellow coloration. In addition to being expensive, this relatively high concentration of $CeO_2$ often causes a degree of opacity in the base glass due to precipitation of insoluble crystalline forms of cerium oxide.

It is therefore an object of the present invention to provide a novel method of improving the spectral absorption characteristics of cerium containing glasses while maintaining the cerium content at a minimum.

Another object is to provide a method of increasing the spectral absorbency of cerium containing glasses in the long range ultraviolet and short wave visible regions of the spectrum.

A further object is to provide a method for more effectively utilizing cerium as a yellow and yellow-green colorant in vitreous systems.

In attaining the objects of this invention, one feature resides in preparing a vitreous composition having a low cerium oxide content in addition to a relatively small concentration of molybdenum oxide.

The above, as well as other objects, features and advantages of the present invention will become apparent from the following detailed description thereof.

FIGURES 1 through 6 are charts illustrating the spectral transmission and spectral absorbency characteristics of glasses of the present invention as functions of the wavelength.

It is frequently found most effective to practice the present invention by incorporating a small amount of materials capable of forming molybdenum oxide into a vitreous system containing cerium oxide. We have found that the presence of the molybdenum in a cerium glass unexpectedly decreases the spectral transmission at any given wavelength in the critical ultraviolet region. This outstanding result is demonstrated by standard spectrophotometric techniques.

The present invention can be utilized in conjunction with practically any vitreous system. The examples that follow demonstrate the practicality of the invention in terms of commercial glasses (i.e. soda-lime-silica, magnesium-aluminum-silicate and borosilicate glasses) and therefore should not be interested by way of limitation.

The amount of cerium and molybdenum present in the glass composition depends on the final use of the glass as well as the process economics, but we have found for many applications involving ultraviolet absorbency and/or use in producing yellow colored glasses, the ranges are as follows in percent by weight of the overall glass compositions.

|  | Percent | |
|---|---|---|
|  | General range | Preferred range |
| Cerium as $CeO_2$ | 0.1–5 | 0.5–3 |
| Molybdenum as $MoO_3$ | 0.1–5 | 0.5–3 |

In its broadest aspects, the invention can be practiced in conjunction with any compatible glass composition.

Glasses within the following range represent suitable overall glass compositions into which the above amounts of cerium and molybdenum can be incorporated within the scope of the present invention.

| Component: | Range (percent by wt.) |
|---|---|
| $SiO_2$ | 60–85 |
| $Al_2O_3$ | 0–25 |
| $B_2O_3$ | 0–18 |
| $Na_2O$ | 0–16 |
| $K_2O$ | 0–5 |
| $Li_2O$ | 0–3 |
| $CaO$ | 0–18 |
| $MgO$ | 0–25 |

In the above tables, it is seen that about 0.1% of cerium oxide in combination with about 0.1% molybdenum oxide are the minimum concentrations that produce commercially desirable results including an unexpected synergistic action. The upper limit on the concentration of cerium and molybdenum is established primarily by economic considerations. It will be understood that the greater the concentration of cerium and molybdenum, the greater will be the spectral absorption and the deeper will be the yellow or yellow-green coloration.

"Absorbency" is a standard unit of measurement in spectrophotometry, and is generally defined as log $(I_o/I)$ wherein $I$ is the intensity of a beam of light after passing a given distance through the absorbent medium and $I_o$ is the intensity of the incident beam. In any system, the probability of absorption is directly proportional to the concentration of the absorbing agent or species. Therefore, when two or more absorbing agents or species are present in the same medium, the expected absorbency will be at the very most equal to the summation of the absorbency of the individual components. Therefore, when there is no unexpected interaction, the absorbency of a glass containing more than one absorbing agent or species is subject to calculation by simple addition.

Accordingly, we have found that the ultraviolet absorbing characteristics of cerium containing glasses are greatly enhanced by the presence of a small amount of molybdenum. The presence of cerium and molybdenum has been found to enhance the ultraviolet absorbing characteristics over the entire range of composition studied. It was noted that in certain compositions unexpected interaction resulted in improvement beyond all expectations. For instance, in a system containing cerium and molybdenum one would expect the absorbency to be equivalent to the summation of the absorbency attributable to the cerium concentration plus the absorbency attributable to the molybdenum concentration. We have found that in vitreous systems there is an unexpected interaction between cerium and molybdenum to produce absorbency greater than the summation of the individual absorbency at wavelengths in the ultraviolet and shortwave visible regions of the spectrum.

The present invention will therefore have its greatest utility in producing more efficient ultraviolet absorbing glasses while at the same time using less cerium.

The principles herein disclosed also provide more economical, low concentration cerium-yellow glasses. The present invention can be utilized effectively in any vitreous system utilizing cerium as a coloring agent or ultraviolet absorbant. The molybdenum and cerium may be incorporated into the glass in any conventional manner, and there are no special melting conditions required. Any molybdenum or cerium compounds may be used provided they will be converted to the oxide under the prevailing glass melting temperatures and conditions.

The following data and examples should be interpreted as illustration of commercial practicality of the invention and not by way of limitation.

EXAMPLE I

Figure 1:
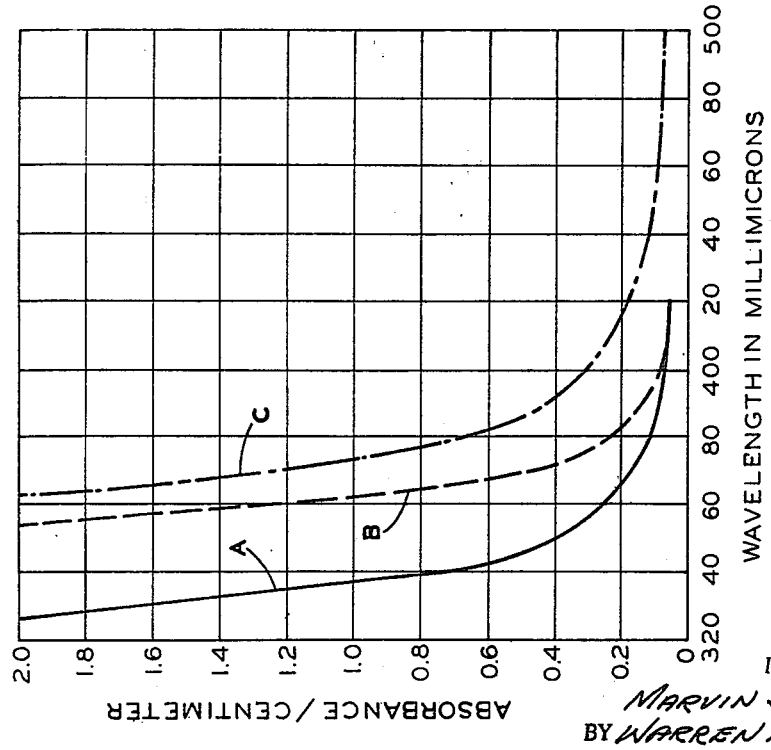

Composition A (Table II) was prepared by melting the batch materials of the corresponding column of Table I (designated "A") in a conventional electric laboratory furnace in about a 200 gram batch in a platinum crucible. The melting temperature was about 2600°–2900° F. in the presence of ambient air. Nothing unusual was noted during melting. After the glass melt had become homogeneous and refined (about 3–4 hours) it was gradually cooled to room temperature. A portion of this glass was ground and polished and the spectral absorbence (per unit thickness) was determined for various wavelengths by standard spectrophotometric equipment and techniques. A plot of absorbence versus wavelength is shown in FIGURE 1. This composition was designed to serve as a control for the molybdenum absorbence. The transmission of Composition A as a function of wavelength is shown in FIGURE 2.

Composition B (Table I) was prepared from the corresponding batch materials from Table I according to the procedure used in preparing Composition A. The spectral absorbency and transmission values were determined by the same method as for Composition A, and the results appear as designated in FIGURE 1 and FIGURE 2. This composition was designed as a control for the cerium absorbence.

Composition B (Table II) was prepared from the corresponding batch materials from Table I according to the procedures used in preparing Composition A. The spectral absorbency and transmission value were determined as for Composition A, and the results appear as designated in FIGURE 1 and FIGURE 2. This example clearly demonstrates that the absorbency of the glass cerium and the molybdenum combined is greater than the summation of the individual absorbency of each component.

If the spectral absorbencies were additive, as would be the case if in the absence of a synergistic phenomenon, the summation numerical absorbencies of Compositions A and B, would equal the numerical absorbency of Composition C. FIGURE 1 shows the absorbency of Composition C is unexpectedly greater than the summation of the absorbencies of Compositions A and B.

Additionally, this combination results in an attractive glass of yellow coloration.

EXAMPLE II

Compositions D, E and F (Table II) were prepared from the corresponding batch materials from Table I according to the method of Example I. The spectral absorbency and transmission values were determined by

TABLE I.—BATCH MATERIALS FOR EXEMPLARY COMPOSITIONS (WEIGHT IN GRAMS)

| Batch component | Example I | | | Example II | | | Example III | | |
|---|---|---|---|---|---|---|---|---|---|
| | A | B | C | D | E | F | G | H | I |
| $SiO_2$ (sand) | 143.02 | 143.0 | 143.02 | 188.52 | 188.52 | 188.52 | 150.98 | 150.98 | 150.98 |
| $Al(OH)_3$ | 4.32 | 4.3 | 4.32 | | | | | | |
| $Al_2O_3$ | | | | 4.95 | 4.95 | 4.95 | 46.26 | 46.26 | 46.26 |
| $B_2O_3$ (anhydrous) | | | | 39.60 | 39.60 | 39.60 | | | |
| $Na_2CO_3$ | 42.88 | 43.0 | 44.70 | 26.81 | 26.81 | 26.81 | | | |
| $K_2CO_3$ | 0.78 | 0.8 | 0.78 | | | | | | |
| $MgCO_3$ | 11.22 | 12.0 | 12.76 | | | | | | |
| $CaCO_3$ | 41.89 | 41.89 | 41.89 | | | | | | |
| $Na_2MoO_4 \cdot 2H_2O$ | 4.35 | | | | | | | | |
| $MoO_3$ | | | 2.56 | 2.50 | | 2.50 | 2.5 | | 2.50 |
| $CeO_2$ | | 2.5 | 2.00 | | 0.63 | 0.63 | | 2.5 | 2.5 |
| $MgO$ | | | | | | | 50.73 | 50.73 | 50.73 |

TABLE II.—EXEMPLARY COMPOSITIONS (WEIGHT PERCENT)

| | Example I | | | Example II | | | Example III | | |
|---|---|---|---|---|---|---|---|---|---|
| | A | B | C | D | E | F | G | H | I |
| $SiO_2$ | 70.61 | 70.79 | 69.94 | 75.6 | 75.60 | 74.82 | 60.39 | 66.39 | 59.78 |
| $Al_2O_3$ | 1.41 | 1.42 | 1.40 | 1.97 | 1.97 | 1.95 | 18.32 | 18.32 | 18.13 |
| $B_2O_3$ | | | | 15.15 | 15.15 | 14.99 | | | |
| $Na_2O$ | 12.76 | 12.79 | 12.64 | 6.29 | 6.29 | 6.22 | | | |
| $K_2O$ | 0.31 | 0.31 | 0.30 | | | | | | |
| $MgO$ | 2.67 | 2.67 | 2.64 | | | | 20.29 | 20.29 | 20.9 |
| $CaO$ | 10.96 | 10.99 | 10.86 | | | | | | |
| Molybdenum as $MoO_3$ | 1.28 | | 1.25 | 1.0 | | 1.0 | 1.0 | | 1.0 |
| Cerium as $CeO_2$ | | 1.00 | 0.98 | | 1.0 | 1.0 | | 1.0 | 1.0 | the methods of Example I and are shown in FIGURES 3 and 4 respectively. From these figures it is readily apparent that an unexpected synergistic result is obtained when cerium oxide and molybdenum oxide are present in the borosilicate glass as evidenced by the unexpectedly enhanced spectral absorbency of Composition F.

EXAMPLE III

Compositions G, H and I (Table II) were prepared from the corresponding batch materials from Table I according to methods of Example I. The spectral absorbency and transmission values were determined by the methods of Example I and are shown in FIGURES 5 and 6 respectively. From these figures, it is readily apparent that an unforeseen synergistic result is obtained when the cerium oxide and molybdenum oxide are present in the magnesium aluminosilicate glass as evidenced by unexpectedly enhanced spectral absorbency of Composition I.

The above examples clearly demonstrate that the absorbence of cerium glasses can be unexpectedly enhanced through the addition of molybdenum, in the ultraviolet and short wave visible regions of the spectrum.

While the invention has been described with reference to certain preferred embodiments thereof, it will be appreciated by those skilled in the art that various changes and modifications can be made in the compositions described without departing from the spirit of the invention.

We claim:

1. An ultraviolet ray-absorbing glass of the composition:

| Component: | Range (percent by wt.) |
|---|---|
| $SiO_2$ | 60–85 |
| $Al_2O_3$ | 0–25 |
| $B_2O_3$ | 0–18 |
| $Na_2O$ | 0–16 |
| $K_2O$ | 0–5 |
| $Li_2O$ | 0–3 |
| CaO | 0–18 |
| MgO | 0–25 |
| $CeO_2$ | 0.1–5 |
| $MoO_3$ | 0.1–5 |

2. An ultraviolet ray-absorbing glass of the composition:

| Component: | Range (percent by wt.) |
|---|---|
| $SiO_2$ | 60–85 |
| $Al_2O_3$ | 0–25 |
| $B_2O_3$ | 0–18 |
| $Na_2O$ | 0–16 |
| $K_2O$ | 0–5 |
| $Li_2O$ | 0–3 |
| CaO | 0–18 |
| MgO | 0–25 |
| $CeO_2$ | 0.5–3 |
| $MoO_3$ | 0.5–3 |

3. A glass composition of claim 1, wherein said glass is yellow in color.

4. A glass composition of claim 1, wherein said glass is a soda-lime-silica glass.

5. A glass composition of claim 1, wherein said glass is a borosilicate glass.

6. A glass of claim 2, wherein said composition is of the system soda-lime-silica.

7. A glass of claim 2, wherein said glass is a borosilicate composition.

8. A glass of claim 6, wherein the composition is:

| | Percent |
|---|---|
| $SiO_2$ | 69.9 |
| $Al_2O_3$ | 1.4 |
| $Na_2O$ | 12.6 |
| $K_2O$ | 0.3 |
| MgO | 2.6 |
| CaO | 10.9 |
| Molybdenum as $MoO_3$ | 1.2 |
| Cerium as $CeO_2$ | 1.0 |

9. A glass of claim 7, wherein the composition is:

| | Percent |
|---|---|
| $SiO_2$ | 74.8 |
| $Al_2O_3$ | 2.0 |
| $B_2O_3$ | 15.0 |
| $Na_2O$ | 6.2 |
| Molybdenum as $MoO_3$ | 1.0 |
| Cerium as $CeO_2$ | 1.0 |

10. A glass of claim 2, wherein said composition is:

| | Percent |
|---|---|
| $SiO_2$ | 59.8 |
| $Al_2O_3$ | 18.1 |
| MgO | 20.9 |
| Molybdenum as $MoO_3$ | 1.0 |
| Cerium as $CeO_2$ | 1.0 |

11. An ultraviolet ray absorbing glass selected from the group consisting of soda-lime-silica glass, borosilicate glass and magnesium-aluminum-silicate glass, said glass containing from about 0.1 to 5% by weight $CeO_2$ and from about 0.1 to 5% by weight $MoO_3$.

12. A method for imparting improved ultraviolet ray-absorbing properties to a glass comprising the step of incorporating into the ingredients which are molten, shaped and cooled to form said glass a sufficient amount of a cerium-containing compound and a molybdenum-containing compound to provide in said resulting glass from about 0.1 to 5 weight percent $CeO_2$ and from about 0.1 to 5 weight percent $MoO_3$.

13. The method as defined in claim 12 wherein said glass is a soda-lime-silica glass.

14. The method as defined in claim 12 wherein said glass is a borosilicate glass.

References Cited

UNITED STATES PATENTS 3,307,958   3/1967   Earl _____ 106—49

FOREIGN PATENTS 764,575   12/1956   Great Britain.

OTHER REFERENCES

Weyl, W. A., Coloured Glass; London (Dawson's Press) 1959 pp. 230–233.

HELEN M. McCARTHY, Primary Examiner

W. R. SATTERFIELD, Assistant Examiner

U.S. Cl. X.R.

106—52, 54; 117—33.3; 250—83, 108; 252—300; 350—1, 2